(12) United States Patent
Budde et al.

(10) Patent No.: US 8,089,187 B2
(45) Date of Patent: Jan. 3, 2012

(54) HIGH-EFFICIENCY, VARIABLE-SPEED PERMANENT MAGNET MOTOR AND CONTROL SYSTEM

(76) Inventors: William A. Budde, Hayward, CA (US); Floyd Knapp, Placerville, CA (US)

(*) Notice: Subject to any disclaimer, the term of this patent is extended or adjusted under 35 U.S.C. 154(b) by 232 days.

(21) Appl. No.: 12/380,847

(22) Filed: Mar. 3, 2009

(65) Prior Publication Data

US 2009/0236922 A1    Sep. 24, 2009

Related U.S. Application Data

(60) Provisional application No. 61/068,050, filed on Mar. 3, 2008.

(51) Int. Cl.
*H02K 21/00* (2006.01)
*H02K 37/00* (2006.01)
*H02K 1/00* (2006.01)

(52) U.S. Cl. ............... 310/152; 310/49.32; 310/180; 310/181

(58) Field of Classification Search .............. 310/152, 310/180, 181
See application file for complete search history.

(56) References Cited

U.S. PATENT DOCUMENTS 3,610,974 A     10/1971  Kenyon
5,585,680 A  *  12/1996  Tsoffka .................. 310/49.32

* cited by examiner

*Primary Examiner* — Quyen Leung
*Assistant Examiner* — Jose Gonzalez Quinones
(74) *Attorney, Agent, or Firm* — William C. Milks, III

(57) ABSTRACT

A high-efficiency motor is disclosed. The motor includes two sets of permanent magnets and further includes electromagnets incorporated to be energized by a control system to provide a variable-speed motor that produces high torque.

15 Claims, 13 Drawing Sheets (1) Unit Overview Fig. 22

HIGH-EFFICIENCY, VARIABLE-SPEED PERMANENT MAGNET MOTOR AND CONTROL SYSTEM

CROSS-REFERENCE TO RELATED PATENT APPLICATION

This application relates to U.S. Provisional Patent Application No. 61/068,050 filed on Mar. 3, 2008, entitled HIGH-EFFICIENCY, VARIABLE-SPEED PERMANENT MAGNET MOTOR AND CONTROL SYSTEM, which is hereby incorporated herein in its entirety by this reference.

BACKGROUND OF THE INVENTION

1. Field of the Invention

The present invention relates generally to electric motors and, more particularly, to electric motors comprising permanent magnets. Specifically, one embodiment of the present invention provides a high-efficiency motor comprising two sets of permanent magnets and further comprising electromagnets incorporated to be energized by a control system to provide a variable-speed motor that produces high torque and a method for providing a high-efficiency, variable-speed permanent magnet motor that produces high torque.

2. Description of the Prior Art

Known electric motors employ an electrical current to generate a magnetic field that interacts with another magnetic field to induce motion. There are two physical components for all electric motors, the armature, or rotor, which moves and the stator which is stationary. Known technologies for electric motors generally fall into two categories, fully-powered and a powered/passive combination. For a fully-powered motor an electrical current is used to generate the magnetic fields for both the armature and stator. A combination motor incorporates permanent magnets to supply one of the magnetic fields, and an electrical current generates the other. Combination motors are typically operated from a DC power source.

An electric/magnetic motor works by utilizing the magnetic attraction/repulsion between magnetic fields that are from the rotor and stator. When these two fields are directly opposite from each other, and magnetically centered, there is the maximum attraction between the two fields, but no torque is being applied to the armature. To induce motion/torque into the armature, the magnetic centers must be offset from each other to induce torque into the armature.

Electric motors and/or generators based on two sets of permanent magnets and having no external power source have been attempted since at least the 1920's. So far they have been unsuccessful. Most of the magnetic arrangements have the armature with one polarity, "North," for example, and the stator has the opposite polarity, "South," for this example. There are two types: what can be referred to as "Type One" is based on perfectly balanced magnetic fields having no discernable magnetic drag, while "Type Two" consists of a series of magnetic flux concentrations with reduced flux between the peaks. Both of these types will keep spinning for many hours slowly loosing momentum and finally stop. This decay is very slow and not perceptible to the eye over the short term. The Type One model has a uniform flux field between the armature and stator with complete balance. The Type Two model steps from one flux peak to another with the force required to exit one flux peak balancing with the force of attraction when entering into the next flux peak, but it is still magnetically balanced. The magnetic field entry force and the magnetic field exit force are of equal magnitude but of opposite polarity.

It would be desirable to provide a motor that overcomes the disadvantages of known attempts at motors that comprise two sets of permanent magnets. More particularly, it would be desirable to provide such a motor that can be controlled to provide high torque at variable speed with high efficiency.

SUMMARY OF THE INVENTION

One embodiment of the present invention provides a system and method for a motor having two sets of permanent magnets and further comprising electromagnets incorporated to be controlled to be energized to provide a high-efficiency, variable-speed motor that produces high torque. The system and method in accordance with the present invention provide an improved high-torque motor that requires only a small amount of electrical power, supplied by a rechargeable battery, for example, to initiate rotation. Also, energy stored in the magnetic field generated during operation is preferably recycled and may be used to recharge the battery. Consequently, the motor is very efficient and environmentally friendly. The principles of the present invention can also be applied to provide a generator having similar advantages.

In accordance with a preferred embodiment of the present invention, one array of magnets is incorporated into a rotational magnetic assembly comprising the armature such that having two or more arrays of magnets allows them to be arranged in a manner that balances the magnetic forces at all rotational angles of the armature. By increasing the spacing between the magnets of the arrays, the resulting magnetic field is not uniform, but increases or decreases between the magnets. This non-uniformity is useful in certain applications as it provides discrete indexing positions. The strength of the index points is a function of magnet strength and the gap between the magnets. Even when the magnet arrays are spread out, the total of the direction of forces of attraction are balanced.

Additionally, a temporary magnetic field can be produced by incorporating electromagnets and used to upset the static magnetic balance of the two arrays. The magnetic field from the permanent magnets only has to be partially canceled or enhanced at the region of magnetic interaction between the two arrays for a short period of time. This induces mechanical movement in the rotational magnetic assembly, that is, rotation for cylindrical arrays. Accordingly, the greater the induced attraction/repulsion the greater the mechanical force available for work.

The temporary magnetic field can be either induced between any two adjacent magnets or applied to a magnet. By placing the generated field between adjacent magnets allows the two temporary field sources on either side of a magnet to be used in conjunction to shift the center of magnetic flux and drag the rotational magnetic assembly based on that shift. By selecting the direction of the current flow though the electromagnet, the polarity of the generated magnetic field can be selected to either aid or reduce the field of the permanent magnet. Having the generated field applied directly to a magnet can either add to or reduce the field of the magnet. Either way, the balanced static flux is upset, and torque is generated in the rotational magnetic assembly.

The foregoing and other objects, features, and advantages of the present invention will become more readily apparent from the following detailed description of various embodiments, which proceeds with reference to the accompanying drawing.

BRIEF DESCRIPTION OF THE DRAWING

The various embodiments of the present invention will be described in conjunction with the accompanying figures of the drawing to facilitate an understanding of the present invention. In the figures, like reference numerals refer to like elements. In the drawing.

DETAILED DESCRIPTION OF THE PREFERRED EMBODIMENTS

Types of Physical Magnetic Patterns

A magnetic field is generated by an electrical current flowing through a conductor. It is the magnitude of the current and not the voltage required to force the current through the conductor that determines the strength of the generated magnetic field. A current-generated magnetic field can be passively amplified by a material with a high Mu (permeability), resulting in a stronger magnetic field without increasing the current or the number of turns of the conductor (longer conductor). The reader is assumed to be familiar with the physics of magnetic fields, their generation, and the meanings and relationships between the various magnetic terms.

As a matter of convention, the term "vertical force" is the force between the top and bottom magnets, and "horizontal force" is the force at right angles to the vertical force. There are basically two different patterns in which the magnets can be arranged, linear and parallel.

Figure 1:
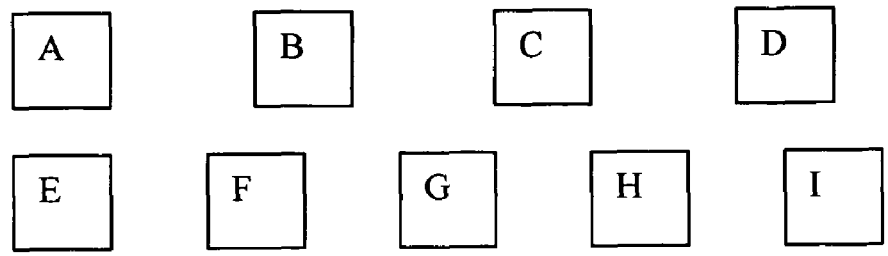
FIG. 1 illustrates two rows of magnets as an example of a linear arrangement.

FIG. 1 illustrates two rows of magnets as an example of a linear arrangement. Each row has the same polarity for all of the magnets in that row. The two rows of magnets have opposite polarities so there is a mutual attraction between the two rows. The two rows of magnets must be arranged with different pitches, one row just has one more magnet than the other. This allows the rows to be indexed relative to each other. There is no limit for the maximum number of magnets. Either of the two rows can be on the stationary permanent magnets and electromagnets assembly and the other on the rotational magnetic assembly.

The magnet array is in a state of horizontal balance. The attraction between magnets A and B has no horizontal component, only vertical. Magnets B and F have a horizontal force component that is balanced by the opposite horizontal force generated by magnets D and I. Magnet C induces horizontal forces on magnets G and H but those forces are of equal magnitude but opposite direction.

Figure 2:
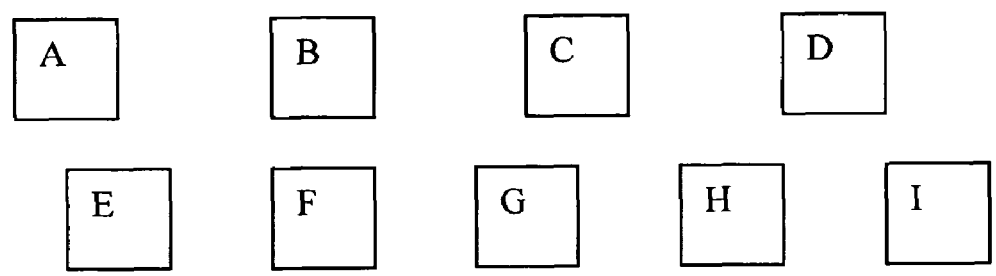
FIG. 2 illustrates the array shown in FIG. 1 after being indexed one step.

FIG. 2 illustrates the array shown in FIG. 1 after being indexed one step.

Figure 3:
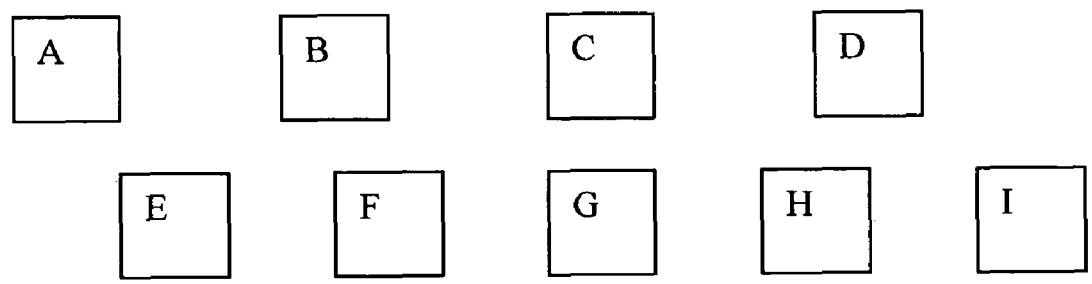
FIG. 3 illustrates the array shown in FIG. 1 after the second index step.

FIG. 3 illustrates the array shown in FIG. 1 after the second index step.

Figure 4:
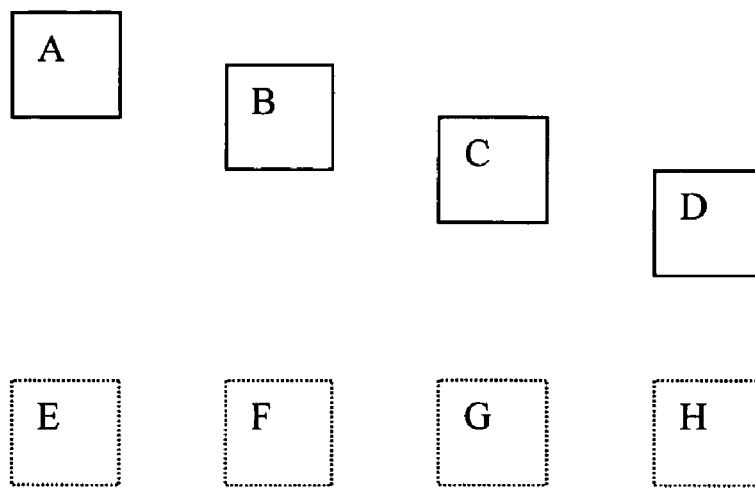
FIG. 4 shows the relative positioning of rotational magnetic assembly (solid) and stationary permanent magnets and electromagnets assembly (dotted) rows for a parallel magnet array.

In contrast, a parallel magnet array has one horizontal row of magnets that is in a straight line and the second row that is staggered by a selected pitch. For a parallel array the pitch can be the height of the magnet or less. FIG. 4 shows the relative positioning of rotational magnetic assembly (solid) and stationary permanent magnets and electromagnets assembly (dotted) rows. The placement of the horizontal row of magnets on the stationary permanent magnets and electromagnets assembly is simply for convenience. The parallel array will function with either horizontal or staggered rows on the rotational magnetic assembly and the opposite on the stationary permanent magnets and electromagnets assembly.

Figure 5:
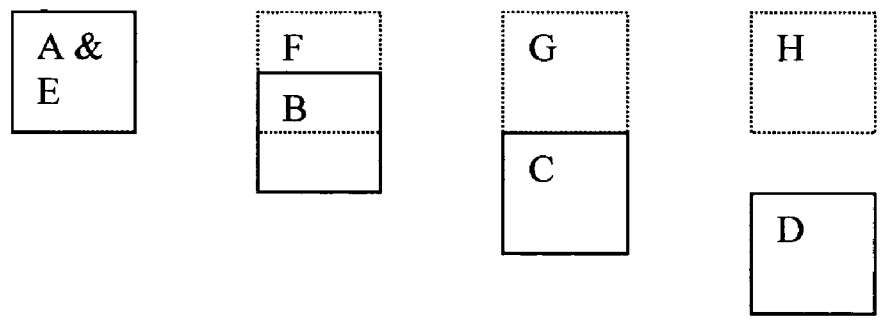
FIG. 5 shows the first index position for the two magnet arrays shown in FIG. 4.

FIG. 5 shows the first index position for the two magnet arrays.

Figure 6:
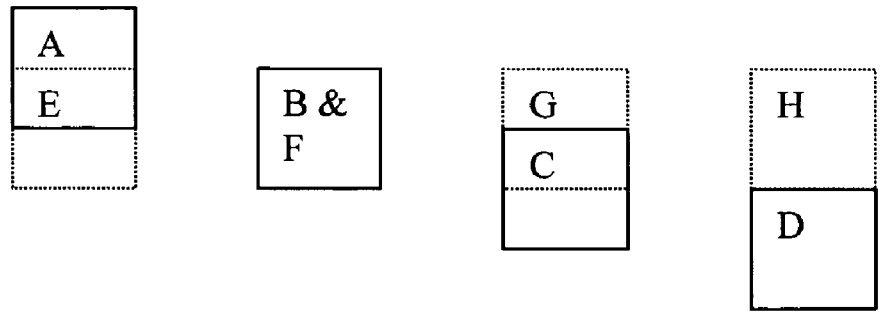
FIG. 6 shows the second index position for the two magnet arrays shown in FIG. 4.

FIG. 6 shows the second index position for the two magnet arrays.

Figure 7:
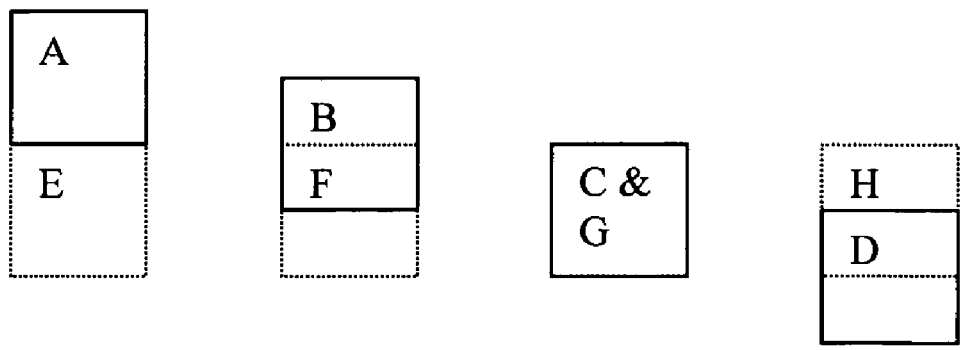
FIG. 7 shows the third index position for the two magnet arrays shown in FIG. 4.

FIG. 7 shows the third index position for the two magnet arrays.

Figure 8:
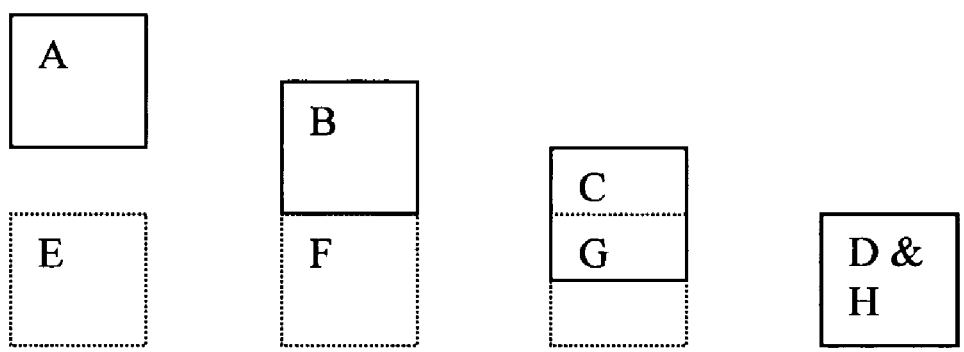
FIG. 8 shows the fourth/final index position for the two magnet arrays shown in FIG. 4.

FIG. 8 shows the fourth/final index position for the two magnet arrays.

In the two above-described examples, the number of magnetic indexes was chosen for clarity and simplicity of drawing. As the number of magnetic indexes increases, the size of the induced magnetic field required to cause an articulated magnet array to step to the next index point decreases. This is due to the reduced magnetic potential barrier between the index points.

In both of the foregoing described examples the rotational magnetic assembly and stationary permanent magnets and electromagnets assembly are "magnetically balanced". This is defined as the attraction and drag forces being equal strength. An arrangement that has the magnets close enough together so there is no discernable magnetic potential barrier to overcome (step) when the rotational magnetic assembly is mechanically moved is defined as "perfectly magnetically balanced". When there are magnetic potential barriers to overcome due to the spacing of the magnets, the "magnetic balance" is from the force of the magnetic drag resulting from moving the rotational magnetic assembly away from the magnetic index which is counterbalanced by the force of attraction from the next magnetic index. As the magnets are moved relative to each other there is a drag while moving away from the first step, which decreases to zero at mid-step and then turns into an attraction to the next step index point. The drag and attraction forces are the same strength but of opposite directions.

Considered in more detail, the pole faces of all magnets have a magnetic center on the surface. This point is defined as the balance point where the magnetic mean of the total of all forces across the pole face is located. When the magnetic field is uniform, the magnetic center point is the geographical or structural center of that pole face. A non-uniform magnetic field will shift the magnetic center away from that geographic center.

When two magnets are interacting inline, where the axes of both magnetic fields are aligned along the same axis, the two magnets will try to align themselves with the magnetic centers inline with each other when opposite poles are facing; and when poles of the same polarity are facing, the maximum repulsion will be when the magnetic centers are inline.

In accordance with the principle applied in accordance with the present invention, a magnetic center can be influenced by external forces. These can be either passive where a magnetically reactive material modifies the magnetic field or an external magnetic field that modifies the subject magnetic field.

An external magnetic field can be generated that will either add to or subtract from a steady magnetic field. When the applied field is the same polarity as the static field, the magnetic center shifts toward the applied field, and the amount of shift is proportional to the strength of the external field. When the applied field is of the opposite polarity as the static field, then the strength of the static field is reduced in the direction of the applied magnetic field, and the magnetic center shifts away from the applied magnetic field.

Figure 9:
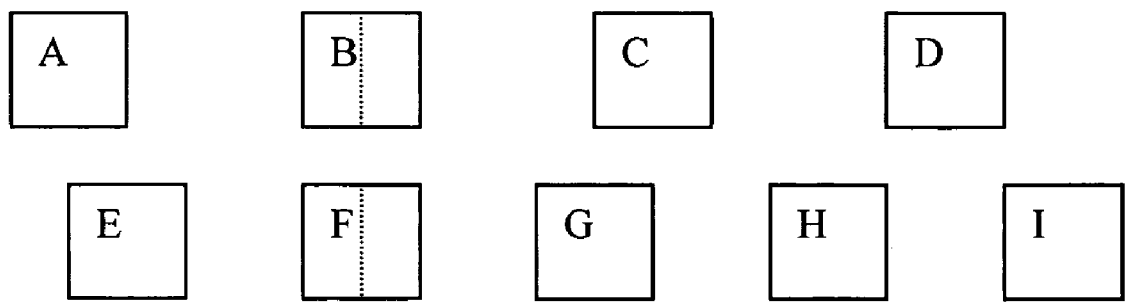
FIG. 9 shows the linear arrangement wherein the dotted lines through the axes of the magnets represent the magnetic centers.

FIG. 9 shows the linear arrangement for clarity, but the influence is the same for the parallel arrangement. The dotted lines through the axes of the magnets represent the magnetic centers.

Figure 10:
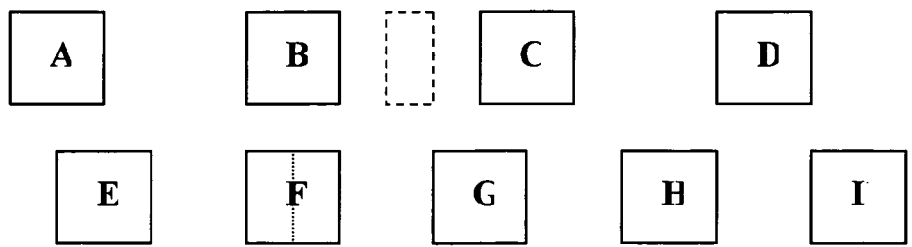
FIG. 10 illustrates the placement of a generated magnetic field shown by the box with the dashed outline.

The placement of a generated magnetic field is illustrated by the box with the dashed outline shown in FIG. 10. Elements "A" through "I" are the permanent magnets of the array. This array is positioned before the temporary magnetic field is generated.

Figure 11:
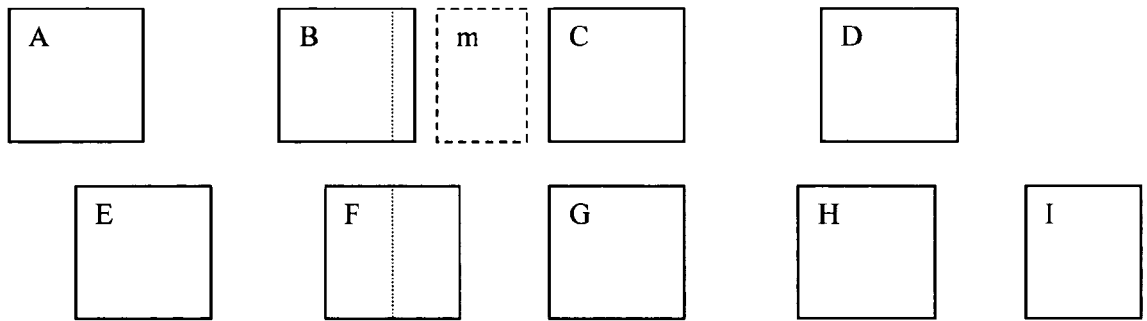
FIG. 11 illustrates the induced magnetic field has been activated and is indicated as "m" with a field polarity that matches the permanent magnets, in which the shifted magnetic centers are shown as the vertical dotted lines.

As shown in FIG. 11, the induced magnetic field has been activated and is indicated as "m" with a field polarity that matches the permanent magnets. The shifted magnetic centers are shown as the vertical dotted lines. The two arrays are now physically shifted due to the shift of the magnetic center. If the polarity of the induced magnetic field is opposite to the permanent magnets, the motion is reversed.

Either type of magnetic array can be arranged in series for linear movement or in a circle for rotational motion. When designing and constructing a linear or rotational device, the use of a linear magnetic array dictates that the total length of the magnetic assembly be an integer multiple of the length of the magnetic pattern. This can be a few inches to over a foot or more, depending upon the size of the magnets utilized and the pitch of the magnetic array. Using a parallel magnetic array allows the scaling of the device in smaller steps, typically twice the dimension of a magnet face in the direction of movement. In summary, the use of linear magnetic arrays results in narrower but longer assemblies while a parallel magnetic array results in a wider assembly but with a smaller step between possible lengths.

Various embodiments of the present invention will now be described in conjunction with the drawing figures to demonstrate the application of the principles utilized for operation. One preferred embodiment utilizes the parallel magnet array physical implementation. As few as two magnet arrays may be used to implement the preferred embodiment with one array being the offset index magnet array on the rotational magnetic assembly and the other array being the parallel magnet array on the stationary permanent magnets and electromagnets assembly.

Switching of the electromagnets that create temporary magnetic fields to control the position of the rotational magnetic assembly, relative to the stationary permanent magnets and electromagnets assembly, is required in some manner. Three different switching methods will be briefly described. These methods are:

A method that uses cam driven switches which are synchronized to the rotational magnetic assembly to turn the electromagnets on and off may be provided, but is mechanically complicated and does not, by itself, allow power, speed, or direction control.

A time-based switching method may be implemented. This requires that the RPM of the rotor is constantly monitored and the time from an index point, either a physically determined position or a calculated relative position, to each electromagnet switching point is determined by the measured/calculated RPM. This requires a fast computational unit to track the position and does not lend itself to efficient acceleration/deceleration conditions.

An incremental rotational encoder may be used to derive both RPM and instantaneous positional information in addition to rotational direction. The incremental encoder was chosen for the preferred embodiment as it can provide very high positional resolution and automatically compensates for acceleration/deceleration conditions. Additional controls to provide direction, power, and RPM control functions may be implemented in a combination of microprocessors, analog functional components, and solid-state logic.

In addition to knowing when to switch the electromagnets on and off, the current through each electromagnet should be controlled for maximum efficiency and for good acceleration and dynamic breaking. The response time of the electromagnet must be factored into the switching times for optimal operation over the widest possible RPM range. Due to the requirements of fast magnetic field generation and decay times, low resistance/low inductance electromagnets are preferably used. The typical field currents are in the 100 A range.

One embodiment of a control system will now be described by way of example but not by way of limitation. The exemplary control system provides the required control and separates the control functions for clarity. The embodiment of the control system is shown in FIG. 12.

Figure 12:
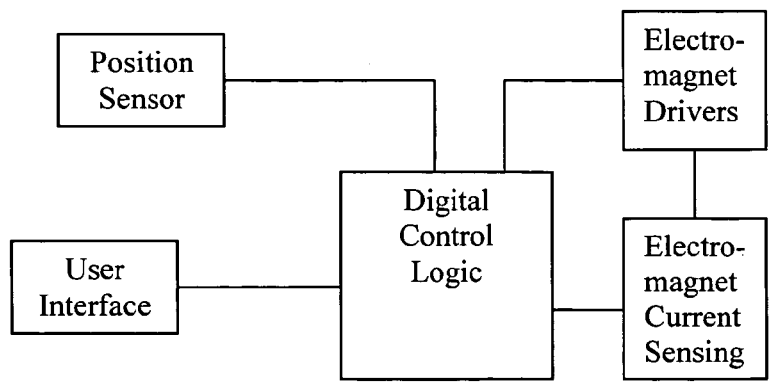
FIG. 12 is a block diagram illustrating one embodiment of the control system in accordance with the present invention.

As shown in FIG. 12, one embodiment of the control system comprises various modules, as follows:

1. A position sensor provides rotor positional information which is relative to the position of stationary permanent magnets and electromagnets assembly. The position sensor also provides RPM, instantaneous speed, and directional information.
2. A user interface is preferably included to provide operational controls such as On/Off, direction, RPM, and operational parameters in addition to test, diagnostic, and calibration functions.
3. Electromagnet drivers include power transistors/FETs that control the current through the electromagnets and the energy recovery circuitry utilized to increase power efficiency.
4. Electromagnet current sensing circuitry functions to obtain information from the electromagnet drivers and conditions that information and passes it to a digital control logic module. There are preferably diagnostic and failure detection functions that are for test and safety, which will not be described in detail.
5. Digital control logic comprises a combination of a microcontroller with hard and programmable digital logic. A microcontroller may be used to handle all the functions; however, from a development standpoint it is easier to implement some functions in hardware. This keeps possible interference between the control functions to a minimum and avoids spending development effort on implementation-specific problems.

The power supplies are commercially available units. For example, the power supply for the electromagnets is a commercially available 5 V at 200 A unit. As there are high circulating currents of 100 A or more, large value, low impedance, high current capacitors are needed to handle the current surges.

The following describes the important circuitry details that are needed for operation of the preferred embodiment. The circuitry that is required for the support of any particular microcontroller or programmable logic array is well-known to persons skilled in the art and therefore will not be described in detail. Nor is any support circuitry that is regarded as standard design described in any detail.

Figure 13:
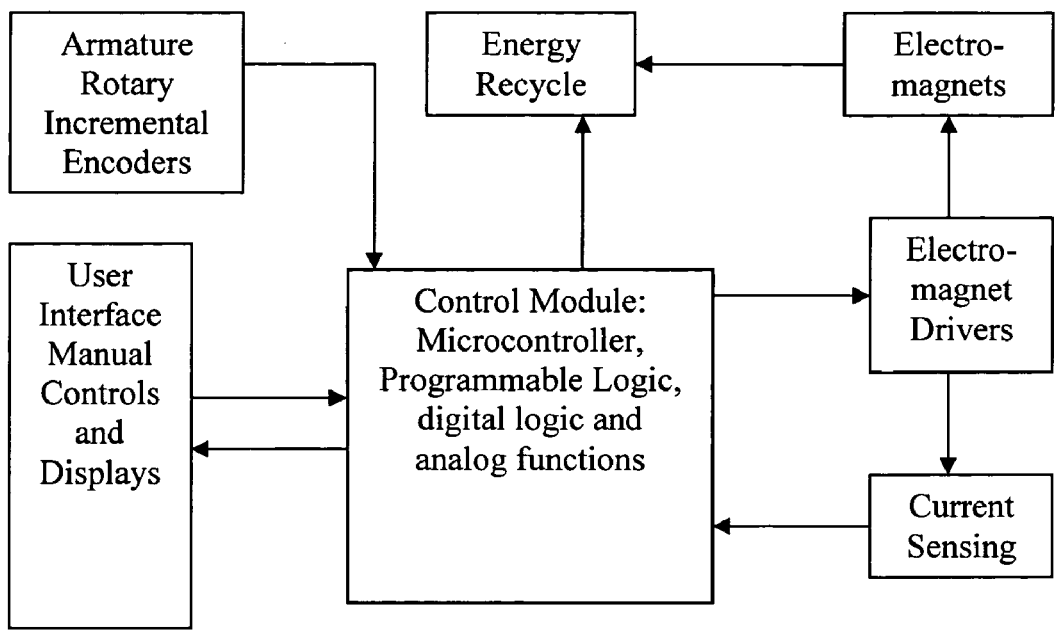
FIG. 13 is a block diagram of the functional blocks of the control system shown in FIG. 12.

FIG. 13 is a block diagram of the functional blocks of the control system.

As shown in FIG. 13, the control system comprises a rotational magnetic assembly rotary incremental encoders module and the controlling electronics. Preferably, the rotational magnetic assembly rotary incremental encoders module includes a pair of rotary incremental encoders, namely, a relative encoder with an index output and an absolute rotary encoder. The resolution of the relative encoder used may be 1024 pulses per revolution or greater for maximum efficiency. The index pulse is used to verify that no pulses have been missed. If there is a difference between the expected pulse count and the actual measured pulse count, the error condition is flagged, and the pulse count is corrected. The direction of rotation is detected by the phase relationship between the two pulse sources, Phase A and Phase B. When starting, the absolute encoder is read to determine the actual position of the rotational magnetic assembly, and the startup sequence is adjusted accordingly. After starting, the absolute encoder is used to double-check the incremental encoder operation.

The control system also comprises a user interface manual controls and displays module, as shown in FIG. 13. There are preferably manual controls to turn the system on and off, control shaft speed, perform diagnostics, and to provide displays to show RPM, power consumption, and other operational parameters.

The electromagnets of the control system shown in FIG. 13 are the devices that are used to modify the strength and shape of the magnetic fields from the permanent magnets. There is one for each stationary permanent magnets and electromagnets assembly permanent magnet.

The electromagnet drivers included in the control system shown in FIG. 13 are the solid-state current switches that control the magnitude and direction of the current through the electromagnets and, hence, the generated magnetic fields.

The energy recycle module of the control system shown in FIG. 13 functions when any electromagnet is turned off so the energy stored in the magnetic field is dumped back into the power supply. The energy recycle module partially recovers the energy used to generate the temporary magnetic field.

The strength of the magnetic field created by one of the electromagnets is directly related to the current flowing through it. The current sensing module included in the control system shown in FIG. 13 allows the control system to measure the current through any coil. This allows the control system to regulate the strength of the generated magnetic fields. Pulse width modulation of the coil currents is preferably used for increased efficiency.

The control module of the control system comprises a microcontroller, as shown in FIG. 13. For example, a Texas Instruments TMS470R1B512PGET may be used as the microcontroller. This is a 32-bit ARM7TDMI based unit with many integrated peripherals. This microcontroller also has:

1. 32 high-end timer channels.
2. 16-channel, 10-bit analog-to-digital (A/D) converter.
3. 7 communications interfaces.
4. Direct Memory Access controller.
5. 512 k byte flash memory.
6. 32 k byte SRAM.
7. Watchdog timer.
8. Real-time interrupts.

As shown in FIG. 13, the control module of the control system additionally includes programmable logic. For example, two programmable logic devices may be used, a Xilinx Spartan3E (XC3S250E) and a Lattice MACHXO (LCMXO1200). This allows easy redesign and high integration. The Spartan3 device handles the two incremental encoders and the tracking of the rotational magnetic assembly. The Spartan3 device also preferably provides the startup, direction, and running control logic in addition to the microcontroller's interfaces to external devices. The Lattice device includes the control logic for the manual controls and drivers for the different displays.

The analog functions shown in FIG. 13 are preferably performed by the microcontroller which has a 16-channel 10-bit A/D converter. This component provides the signal conditioning for current measurements and voltage measurements.

The microcontroller shown in FIG. 13 also preferably provides the digital logic. This is the component that has the microcontroller clock oscillator, power supervisory, and reset circuitry.

There are three operational modes, Start, Run, and Brake. The microcontroller provides operational parameters to the rotational magnetic assembly control logic and commands the transition from Start to Run.

The controls preferably comprise incremental encoders instead of potentiometers. This directly generates a digital code that is tracked using logic in the Lattice FPGA. This eliminates many A/D channels and allows the resolution to be programmable from very coarse through very fine (for example, 4096 steps or more) and dynamically changeable. At power-up, all encoder inputs are set to zero unless a preset value has been stored. A four-line alphanumeric display is preferably included to present requested operational information such as instantaneous RPM, power consumption, and diagnostic information. Preferably, there is a dedicated RPM display in addition to Start and Stop buttons and a dedicated function keypad.

The two incremental encoders on the rotational magnetic assembly serve two purposes. An absolute encoder provides the rotational magnetic assembly position at start-up, while the relative encoder supplies dynamic positional information. Since the position of each magnet on the rotational magnetic assembly is fixed, when a 2048-step resolution is provided by the relative encoder, the microcontroller is provided with high resolution information based on which to make switching decisions.

Preferably, energy recovery from the electromagnets is employed to increase the operational efficiency. The currents flowing in the electromagnets typically range from approximately 50 to 200 A. The magnetic field generated by a given electromagnet is required for a very short time, for example, from less than a millisecond (0.001 second) to a few tens of milliseconds during normal operation. During start-up is the only time that current pulse durations are typically longer. When the field from the electromagnet is not required, the energy stored in the magnetic field is recovered and dumped back into the power supply. There are large capacitors, each several tenths of farads, that are used to store the recycled energy.

The electromagnets are preferably low-resistance coils wound on a ferrite core. Such electromagnets provide a trade-off between low inductance for fast response times and lower currents for efficiency. By keeping the coil resistance in the range of approximately a few milliohms, the voltage drop due to resistance is maintained very low. As an example, 0.00428 ohms resistance with 100 A flowing through it results in a resistive voltage drop of 0.428 V and a power dissipation of 42.8 W. It is the inductive reactance that is used to limit the current through the electromagnet and that dissipates no energy. Due to the presence of stationary magnetic fields and the dynamics of the generated magnetic field, calculating the inductance of an electromagnet is not possible as it is not a constant. If the polarity of the generated magnetic field is opposite to the permanent magnetic field, the initial inductance of the electromagnet is lower than when the field polarities are the same.

Figure 14:
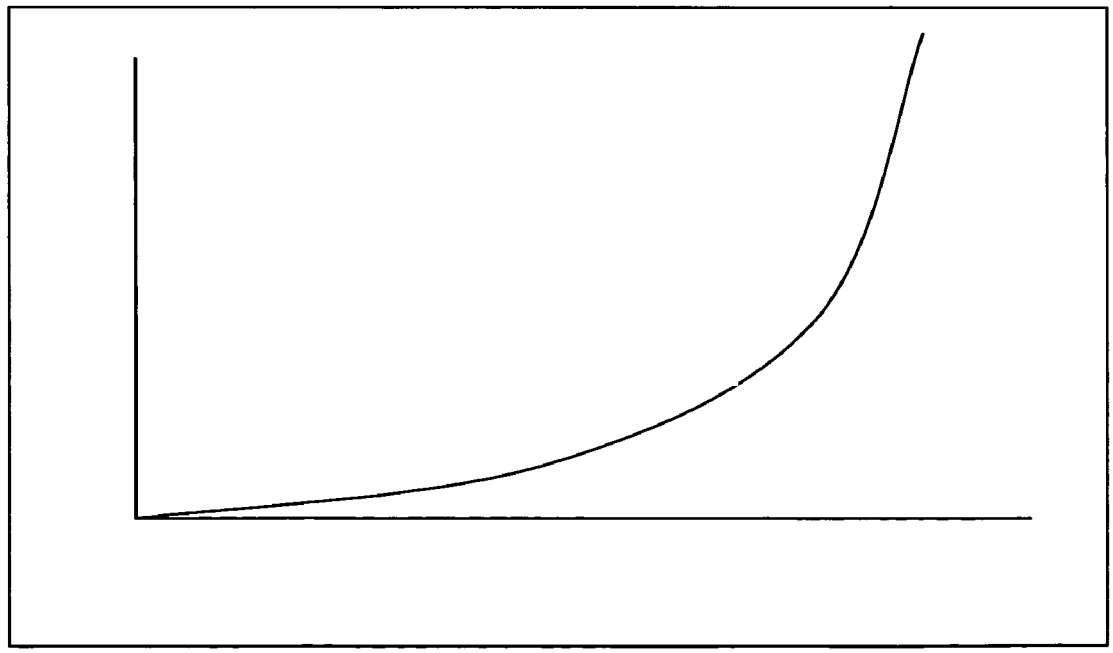
FIG. 14 shows a plot of the current through an electromagnet versus time.

Pulse width modulation (PWM) is employed to regulate the current through each electromagnet. FIG. 14 shows a plot of the current through an electromagnet versus time. Current is the vertical scale, and time is the horizontal scale. The current is initially zero and increases at a rate that depends upon the inductance and coil resistance. When the inductive reactance decays to zero, the current is limited by the circuit resistance, which is a sum of the coil resistance and power supply output resistance and the resistance of any external wires and switching devices.

Figure 15:
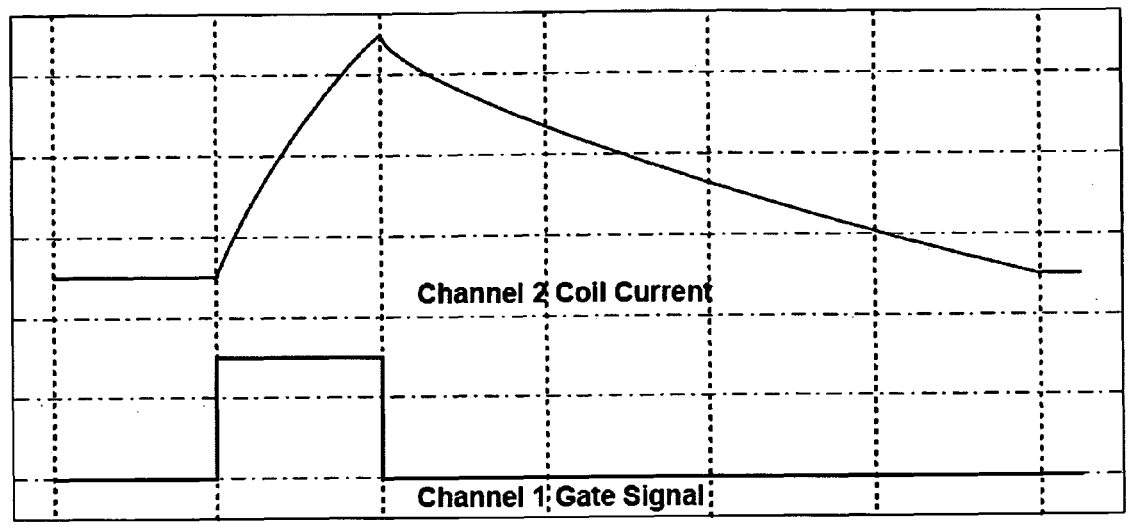
FIG. 15 shows the field build-up time and the decay time using a Schottky diode as the decay current path.

When the supply current through a coil is interrupted, a "back EMF" is generated which is created from the collapsing magnetic field. If a current path is provided and that path has a very low resistance, the decay time is longer than the charge time. This is true as long as the magnetic field has not reached saturation and the current is not resistively limited. A diode functions to provide the needed current path, since the voltage on the leads of the coil switch polarity when the current is interrupted. FIG. 15 shows the field build-up time and the decay time using a Schottky diode as the decay current path. In FIG. 15, the top trace is the electromagnet current, and the bottom trace is the signal that turns the current source on and off.

The magnetic charge time is one time division, and the decay time to zero is very close to 5 time divisions. This represents a 1:5 ratio, or ⅙ of the time is occupied with charging and ⅚ of the time is occupied with discharging.

Figure 16:
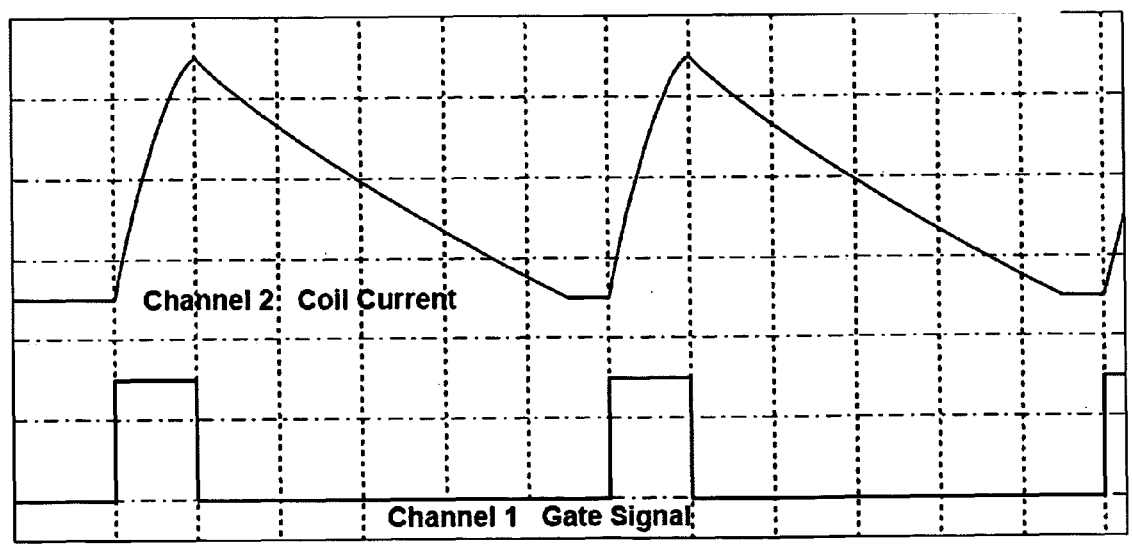
FIG. 16 shows a 1:9 ratio by decreasing the recycle energy losses even lower than the circuit characterized in FIG. 15.

FIG. 16 shows a different circuit value setup which achieves a 1:9 ratio by decreasing the recycle energy losses even lower than the circuit characterized in FIG. 15. In FIG. 16, the top trace is the electromagnet current, and the bottom trace is the signal that turns the current source on and off.

Figure 17:
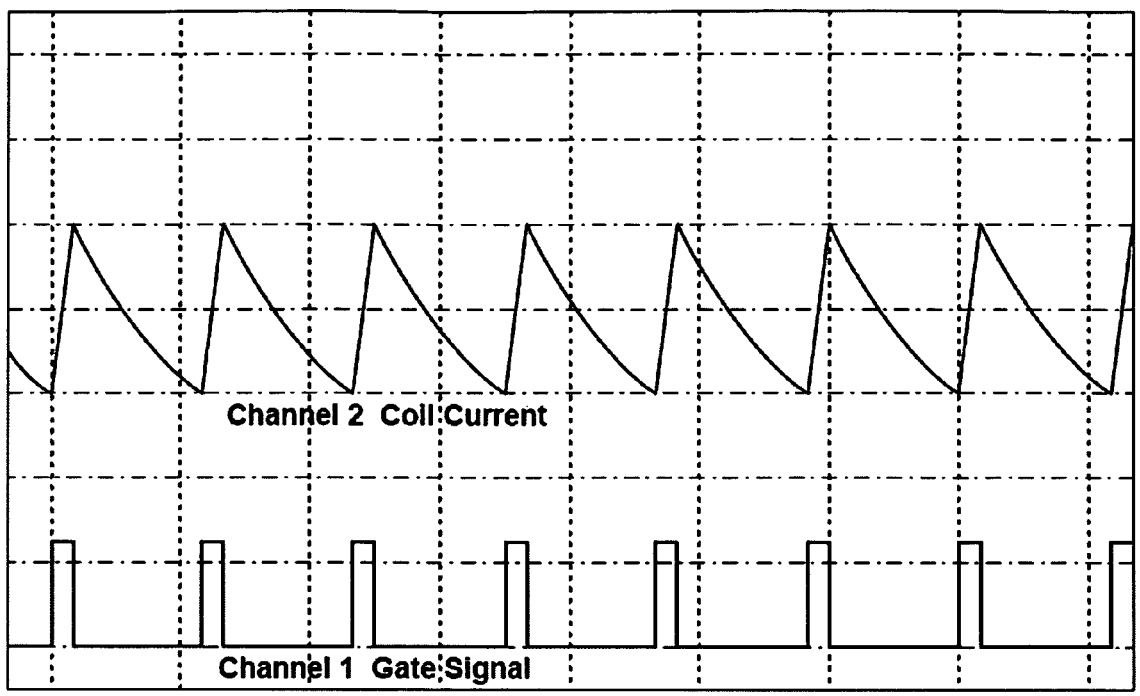
FIG. 17 shows the current level versus time using pulse width modulation to regulate electromagnet current.

By using PWM to control the current, there is less wasted power in the control circuitry. Regulation is achieved by monitoring the current through the electromagnet and when it has reached a predetermined value, the current is cut off, and a diode employs the back EMF to continue the current flow through the electromagnet. As the stored magnetic energy is depleted due to resistive losses, the current decreases. When the coil current drops to the predetermined minimum, power is then reapplied to the coil. FIG. 17 shows the current level versus time using PWM to regulate electromagnet current. In FIG. 17, the top trace is the electromagnet current, and the bottom trace is the signal that turns the current source on and off. This results in a semi-sawtooth current flow that cycles between the high and low levels until the electromagnet field is no longer needed.

Figure 18:
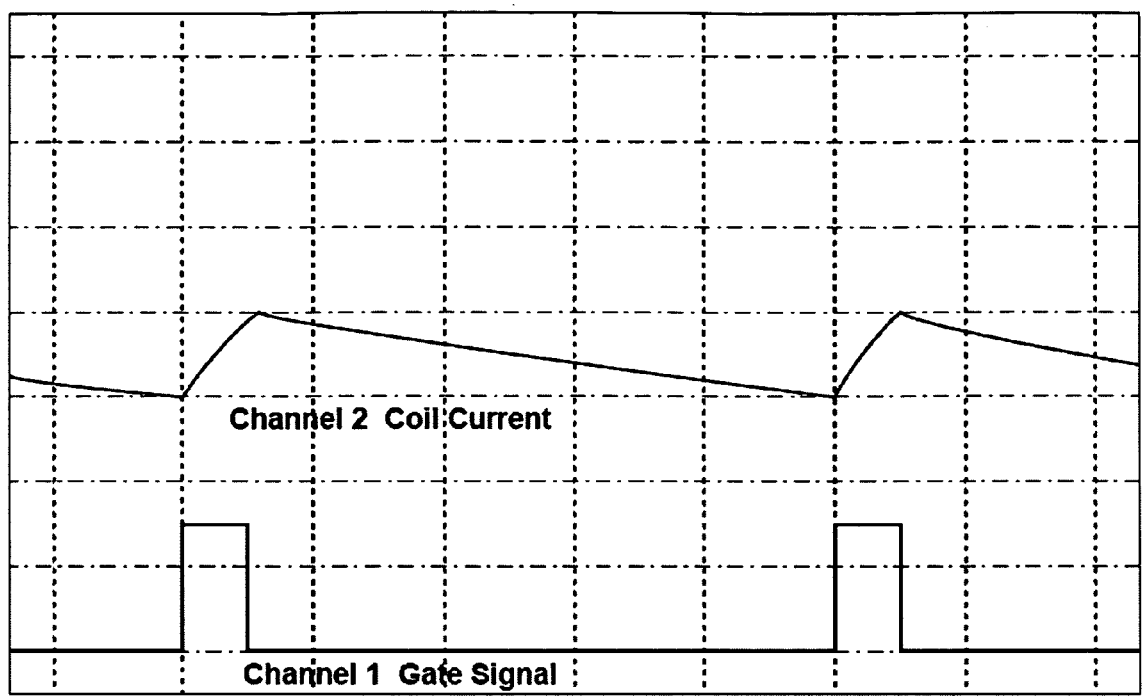
FIG. 18 is an expanded view of the PWM regulation waveform.

FIG. 18 is an expanded view of the PWM regulation waveform. In FIG. 18, the top trace is the electromagnet current, and the bottom trace is the signal that turns the current source on and off. FIG. 18 shows the ratio between field charge time and field discharge times more clearly. One will note that the current waveform is relatively straight with no noticeable curve. This is because only a small percentage of the field is allowed to fluctuate.

Using current measurements to regulate the current results in automatic compensation for unpredictable and variable inductances without having to attempt to characterize the operational parameters and compromise for less than optimal performance.

When the electromagnet is de-energized, the remaining energy in its magnetic field is dumped into storage capacitors to recycle energy.

The drivers for the electromagnets have to handle large currents with minimal voltage drop across the device. Additionally, the turn-on and turn-off times have to be fast to transition through the linear region as quickly as possible to limit power dissipation as much as possible.

Electromagnet current sensing monitors the current flowing through the coil during all conditions. A signal conditioning circuit amplifies and conditions the measurement signal to a useable level. Analog comparators are preferably used to sense the high and low limits and generate signals that are fed to the Spartan3 FPGA where the coil drive PWM circuitry resides. The reference levels used by the analog comparators are set by the microcontroller and are based on the requirements calculated for optimum operation at that instant in time.

The TMS470R1B512PGET microcontroller, Xilinx Spartan3E FPGA, Lattice MACHXO FPGA, power supervisory circuitry, and various analog functions are the major components of the control module. The two FPGAs are the "instant on" type, as the FPGA configuration data is stored in non-volatile memory. The microcontroller program and the configuration codes for the FPGAs are preferably down-loaded via JTAG. Preferably, the control module also comprises power regulators for each FPGA, the TMS470, and the analog functions.

Diagnostic and performance monitoring are also handled by the control module. All supply voltages and currents are preferably monitored, as are all operational parameters and functions. The results are made available to be displayed on the user interface. All operational parameters are changeable via the user interface. This allows fine tuning and easy reconfiguring for testing new operational parameters and configurations.

Direction of rotation of the rotational magnetic assembly is dependent on the sequence in which the electromagnets are energized and de-energized. Only two directions are possible, and consequently only two sequences are required.

The difference between Start and Run is that in the Start mode the current control is initially set to maximum power and is subsequently reduced to a level to maintain idle RPM after motion has been established. In the Run mode, the system regulates the power to the electromagnets to maintain a selected RPM.

Figure 19:
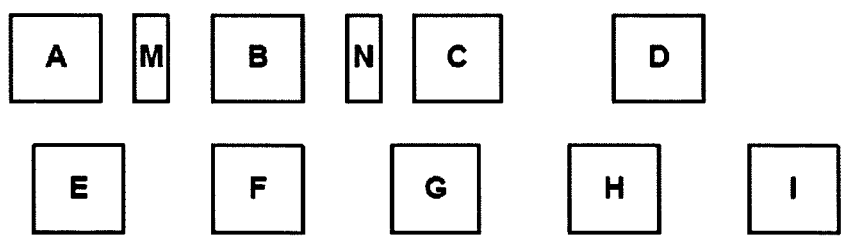
FIG. 19 shows an arbitrarily chosen starting pattern.

Considered in more detail, the rotational magnetic assembly will always stop at a self-induced magnetically stable alignment. An arbitrarily chosen starting pattern is shown in FIG. 19. Elements A through I are permanent magnets, and elements M and N are electromagnets. Magnets A through D are the stationary permanent magnets and electromagnets assembly magnets, and magnets E through I are rotor magnets. Since there is no rotary motion in the rotational magnetic assembly, the motion must be started.

Figure 20:
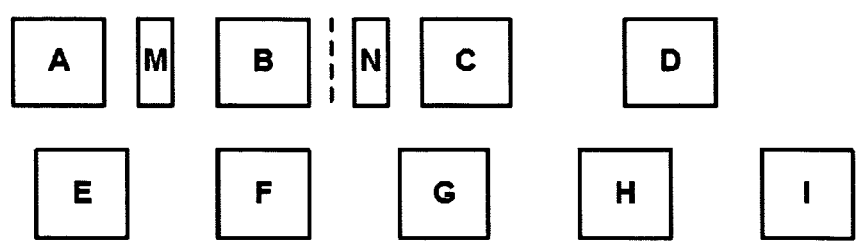
FIG. 20 illustrates using an electromagnet to shift the magnetic center.

In the Start mode, the direction desired selects which of the two sequences is used for operation. Maximum power is employed while starting. This is achieved by energizing electromagnet N with a polarity that is the same as the polarity of magnet B, while electromagnet M is energized with a polarity that is opposite to the polarity of magnet B. This shifts the magnetic center much further toward magnet C than simply using electromagnet N to shift the magnetic center. The dashed line shown in FIG. 20 indicates the new magnetic center. This extra energy results in two magnetic centers aligning for maximum torque.

Figure 21:
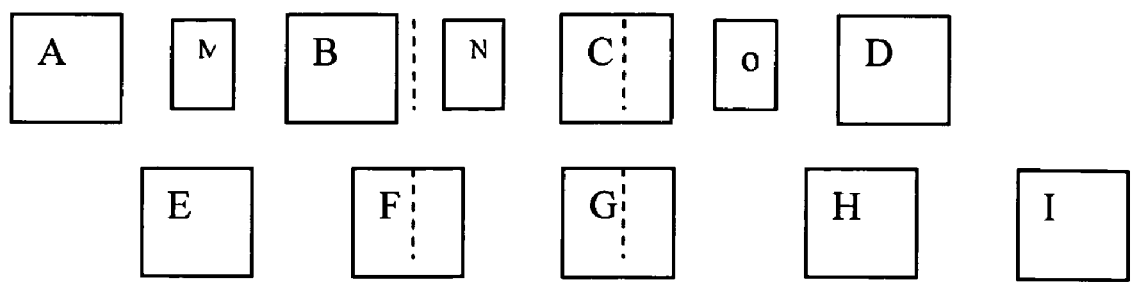
FIG. 21 illustrates using an additional electromagnet to further shift the magnetic center.

The next step uses electromagnets N and O, as shown in FIG. 21, and repeats the above-described operation. In this manner, as the rotational magnetic assembly moves, each pair of electromagnets is used around the stationary permanent magnets and electromagnets assembly for accelerating the rotational magnetic assembly and reducing the power until the idle RPM is reached.

Running differs from the Start mode by adjusting power to the electromagnets to maintain a selected RPM in the Run mode. If the RPM is higher than desired, the power to the electromagnets is reduced until the RPM drops to the required speed. The control system can also enter the Brake mode to reduce the RPM if that characteristic is desired. If possible, the control system uses just the leading electromagnet to maintain speed or accelerate to the selected RPM. The control system makes the decision of when to use the trailing electromagnet to aid the leading electromagnet.

To operate with dynamic braking in the Brake mode, the polarity of the electromagnets is reversed from the polarity employed for the Run mode. The current through the electromagnets determines the dynamic braking force.

Using the rotary incremental encoder facilitates implementation of the control system. Other rotational magnetic assembly position/angle of rotation methods that are contemplated as alternatives are phase angle measurement or resistive or capacitive. All of these require additional signal measurement steps to digitize the signal. The incremental encoder can provide very high resolution, for example, 8192 steps per revolution and higher. In an exemplary implementation, 2048 steps per revolution yields 0.17571825 degrees per step or 0.013671875 inches per step for a 28-inch rotational magnetic assembly circumference.

An incremental encoder generates a dual phase digital pulse train. This gives one pulse per step and the rotational direction. This digital signal is used to increment/decrement a digital counter. The direction information selects up or down count. The index pulse is used to verify the count. If the count is not what is expected when the index pulse occurs, the count can be adjusted to correct for any missed pulses.

Since the positions of all the magnets are known, the count for the energizing or de-energizing of each electromagnet corresponds to a unique count value. The control system shifts these count values depending upon the mode of operation. For each rotor diameter, size of magnet, and magnetic step size, the transition points may thus be uniquely located.

An example of an indexing step, for a simple step, will now be described. The values used in this example are exemplary only, but the sequence is accurate no matter what size the rotational magnetic assembly is or what the pitch of the magnets is. Suppose the index count for the originating magnetic center is 350. Also, suppose that the index count for the next magnetic center is 406. The index count for turn-on of the electromagnet between originating and target magnetic centers may thus be 320. This value is dependent upon rotational magnetic assembly RPM as it compensates for the magnetic field build-up time. Furthermore, the index count for termination of electromagnet current and start of energy recovery cycle may be 380. The energy recovery cycle is terminated when the recovered current drops below 10% of peak electromagnet current. Finally, the index count for turn-on of the electromagnet between the new originating and target magnetic centers may be 370.

The same corresponding electromagnets of all magnet arrays are controlled the same way at the same time. This is the case for both parallel and serial magnetic arrays. After stepping through all the magnetic index centers the sequencing pattern is repeated again.

Figure 22:
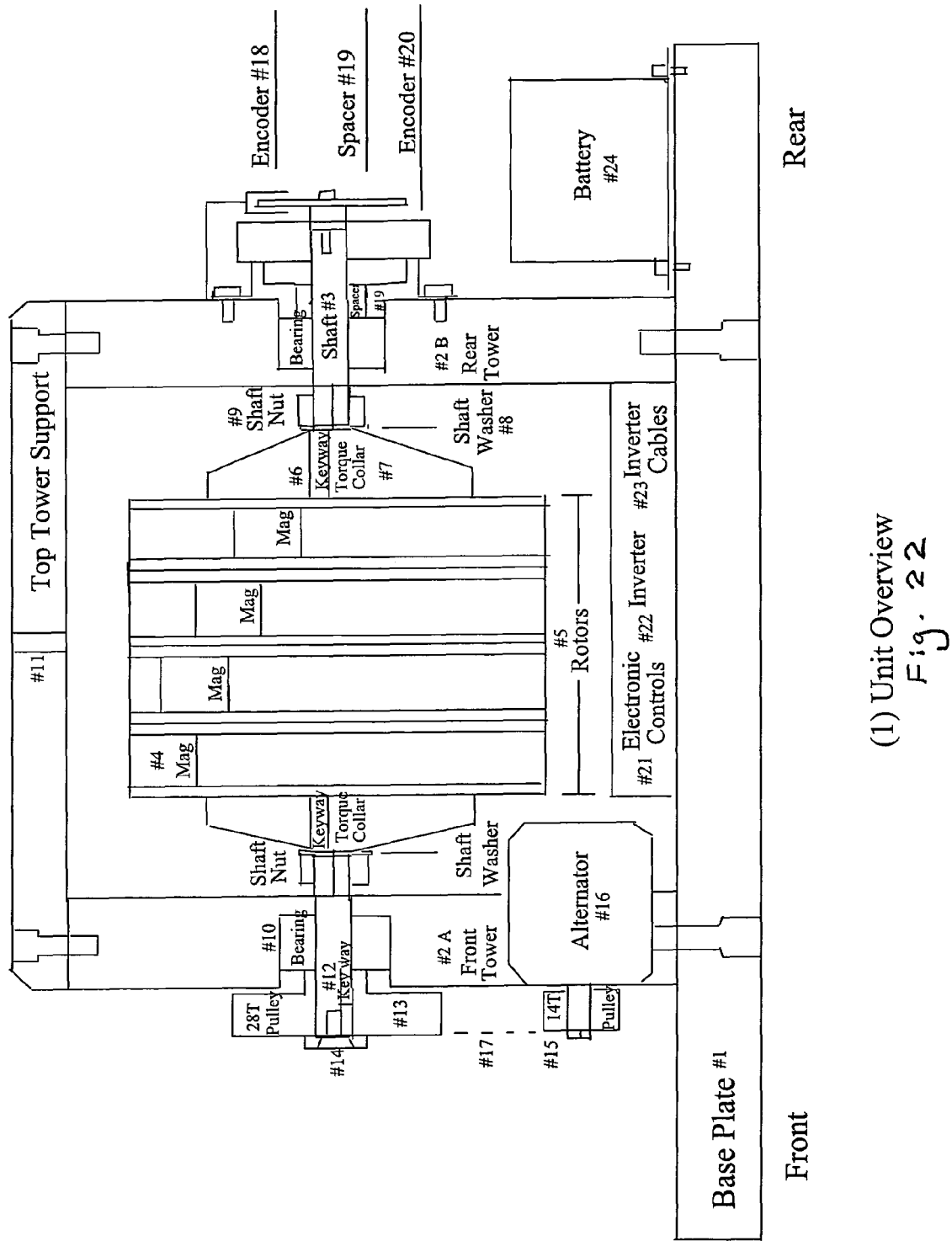
FIG. 22 is a breakaway side view of a portion of a motor in accordance with a preferred embodiment of the present invention.

The dynamo in accordance with a preferred embodiment of the present invention comprising the permanent magnet/electromagnet structure and magnetic field control system will now be described in more detail with reference to FIGS. 22 through 25. FIG. 22 shows a preferred embodiment of a motor and control system in accordance with the present invention.

Figure 23:
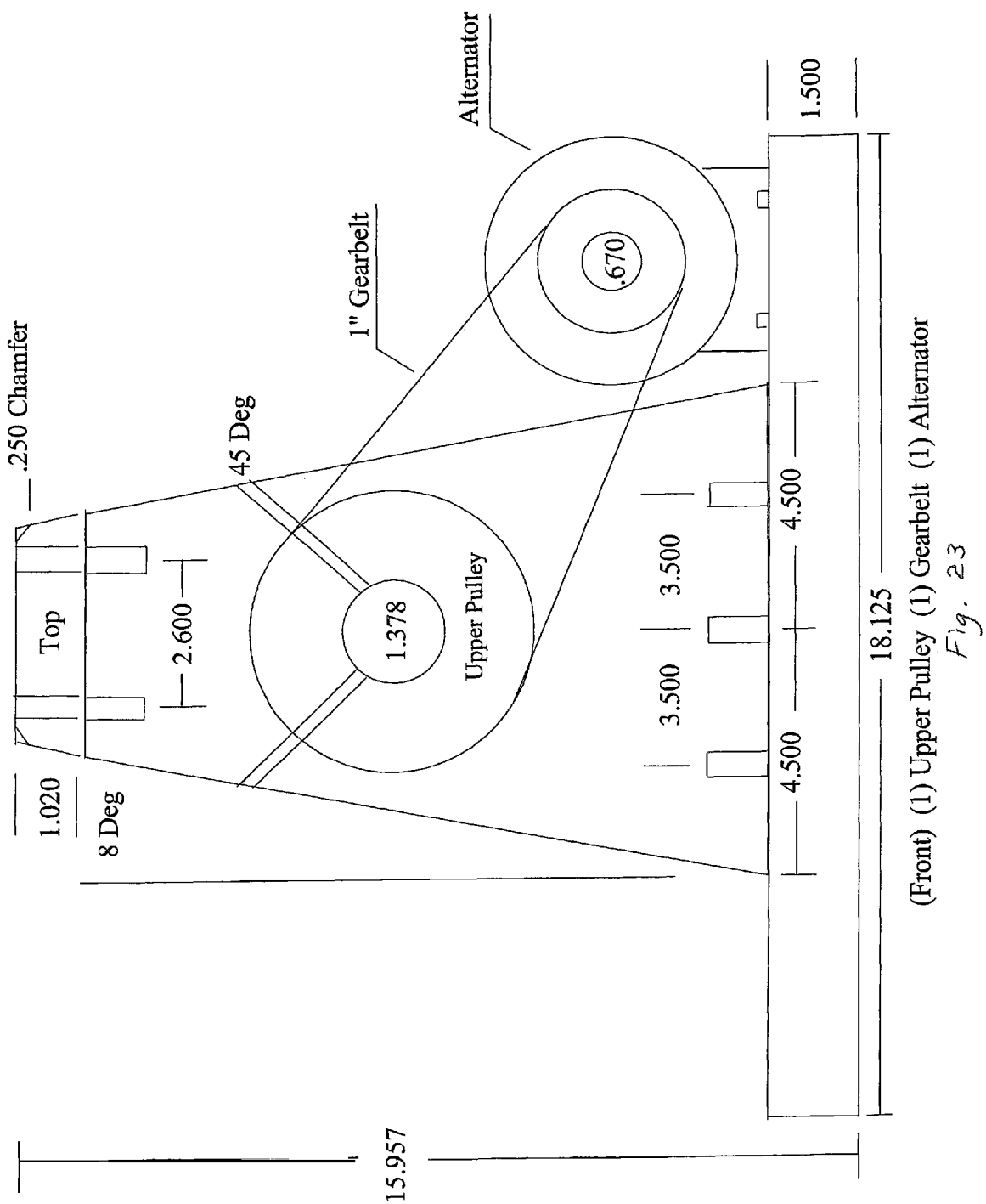
FIG. 23 is a front end view of the motor shown in FIG. 21.
Figure 24:
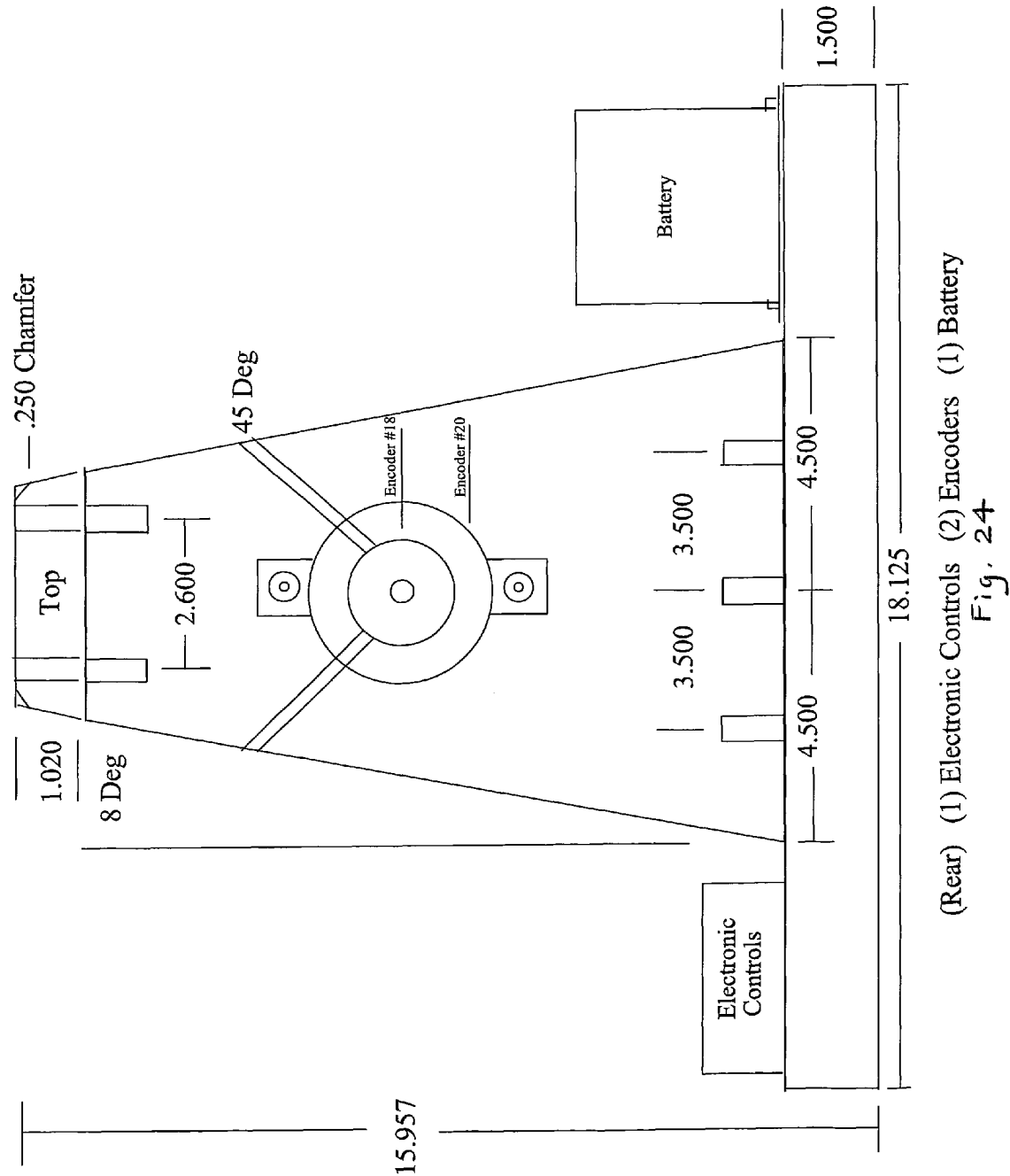
FIG. 24 is a rear end view of the motor shown in FIG. 21.

As shown in FIG. 22, the motor comprises a base plate 1. As shown in FIGS. 22 and 23, a front tower 2A is mounted to the base plate 1. Similarly, as shown in FIGS. 22 and 24, a rear tower 2B is mounted to the base plate 1. A main shaft 3 is rotatably supported by the front and rear towers 2A and 2B.

A rotational magnetic assembly 5 comprising a plurality of permanent magnets is mounted to the main shaft 3, as shown in FIG. 22. For example, the rotational magnetic assembly may comprise four permanent magnets. The respective ends of the rotational magnetic assembly 5 are provided with a torque collar keyway 6 that receive a key on the main shaft 3. As shown in FIG. 22, torque collars 7, shaft washers 8, and shaft nuts 9 are utilized at the respective ends of the rotational magnetic assembly 5 to secure the rotational magnetic assembly to the main shaft 3.

The main shaft 3 is rotatably mounted in bearings 10 disposed in the front and rear towers 2A and 2B. The front and rear towers 2A and 2B are reinforced by a top tower support 11.

A keyway upper pulley 12 and an upper gear belt pulley 13 are mounted to the main shaft 3, as shown in FIGS. 22 and 23. An upper gear belt holding washer 14 maintains the upper gear belt pulley 13 on the main shaft 3. Additionally, a lower gear belt pulley 15 is mounted to the shaft of an alternator 16 secured to the base plate 1 proximate the base of the front tower 2A. The alternator 16 may be a Model GM AD244 alternator available from HO Alternators, Inc. located in Davenport, Iowa. A gear belt 17, which may be a Browning HPT belt, interconnects the upper and lower gear belt pulleys 13 and 15, as shown in FIGS. 22 and 23.

A shaft end play spacer 19 mounted to the opposite end of the main shaft 3 from the upper and lower gear belt pulleys 13 and 15. One or more encoders 18, 20 are mounted to the main shaft 3.

Electronic controls 21 and an inverter 22 connected to the alternator 16 are mounted to the base plate 1, as shown in FIGS. 22 and 24. The inverter 22 may be a Vector Model VEC056D 2500 watt power inverter. Inverter cables 23 electrically connect the alternator 16 to the inverter 22, and the inverter is in turn connected to a rechargeable battery 24 mounted to the base plate 1. The inverter cables 23 may be Vector Model VEC085D power inverter cables, and the battery 24 may be a Model 75/25 available from Optima Batteries, Inc. located in Aurora, Colo.

Figure 25:
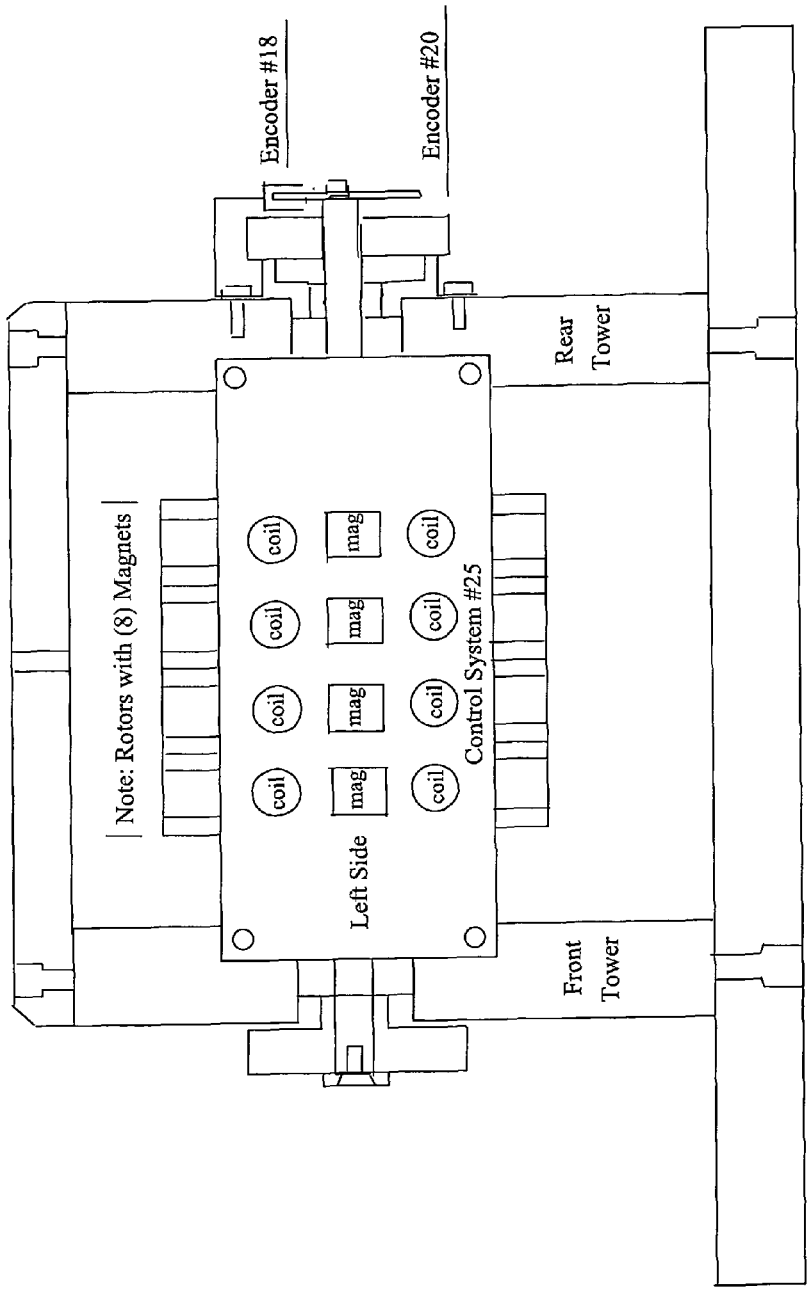
FIG. 25 is a side view of a portion of the motor in accordance with the preferred embodiment of the present invention.

As shown in FIG. 25, the motor further comprises a stationary permanent magnets and electromagnets assembly and control system 25 mounted to each side of the front and rear towers 2A and 2B. Each stationary permanent magnets and electromagnets assembly and control system 25 comprises a plurality of permanent magnets and a plurality of electromagnets. For example, there may be four permanent magnets and eight electromagnets consisting of coils incorporated into each stationary permanent magnets and electromagnets assembly and control system 25.

As described earlier, the basic architecture of the magnetic field control system 25 comprises an FPGA used for acquiring positional information from both an incremental encoder 18 and from an absolute encoder 20, as shown in FIGS. 13 and 25.

The data produced by the absolute encoder 20 is preferably in parallel format, but may be in a serial protocol. The absolute encoder 20 data is preferably 12-bit parallel data which is latched in at a 100 kHz rate. At starting and low RPMs, the absolute encoder 20 data is used, but above a certain RPM, operation changes over to the incremental encoder 18 due to the relative response times.

The incremental or indexing encoder 18 is preferably a 12-bit resolution quadrature encoder. Obtaining higher resolution for incremental encoders is easier than for absolute encoders. The incremental encoder 18 provides a pulse each step, and the phase carries directional information. It is preferred if there is an indexing pulse to flag rollover. This way any error can only affect one rotation, and errors do not accumulate.

The encoders 18 and 20 need to be phased properly, and a timing mark is the preferred approach. An LED may be utilized, but the response times have to be verified before one can be used as a strobe. The strobe function should be built in, with no externally supplied test equipment needed. Because the encoders 18 and 20 have 12-bit resolution, this yields 4096 locations around the circumference of the rotational magnetic assembly. This divides the rotational magnetic assembly into 0.087890625-degree increments. It is 5.2734375 minute of arc per pulse and 11.37777 . . . pulses per degree of arc. Each diameter of rotational magnetic assembly will have to be worked out as to how may increments it is between poles, phases, and pulse duration measurements. If needed, a timer may be utilized for more accurate duration times, but simple increments are preferred with adjustment of the current using PWM to obtain the required field strength.

In accordance with one exemplary implementation, the rotational magnetic assembly has a circumference of 28 inches. Directly calculated timing information for a 28-inch circumference rotational magnetic assembly is as follows: 1 inch=12.875 degrees of arc. This corresponds to 146.2857 pulses/steps per inch of circumference. Consequently, there is 0.0068359375 inch of circumference per encoder step at 4096 increments per complete revolution.

Field buildup time may have to be compensated. This means that at low RPM, calculated timing points can be used with no compensation, but at higher RPM, the field lag will have to be figured in and the field will be energized and removed sooner than direct calculations indicate.

The control system 25 preferably shown in FIG. 25 comprises a position transition module to compare the new value with the last stored value, and if there is a difference, a "possible change" flag is set and the new value is loaded in a temporary register. On the occurrence of the next clock, the new and the temporary values are compared. If they are the same, then a "possible" flag is cleared, and a "new position" flag is set. This is used to cause any other module to check for positional changes. This flag is then cleared with the next positive position compare. Each module resets its own private flag bit. The position codes are resident in compare registers, and the position data is derived from them. In this manner, a code change is verified before it is presented to the remainder of the control system. Also, the new and old codes are compared to derive direction.

The timing of the active control and drive power levels are also handled by the FPGA. The power level, either PWM or shortened pulse duration, is established externally and loaded into parameter registers for use by the control system 25. The control system 25 handles transitions between phases and pole commutation.

As described earlier, there are three distinct operational functions or modes, namely, Start, Run, and Stop. The Start mode has control until the rotational magnetic assembly has achieved the selected RPM. Start is the same as Run, except that maximum power level is preferably initially used and then scaled back at the selected RPM setpoints. At the beginning of the Start mode, power is at maximum, and preferably the control system 25 starts scaling back at 50%, 75%, and finally converts to idle power levels at 100% of idle RPM. To slow down rotation, the reverse electromagnets may be energized instead of the forward electromagnets. In the Stop mode, the control system 25 preferably applies full power so that the rotation of the rotational magnetic assembly is reversed until all motion is stopped. When the rotational action has stopped, the rotational magnetic assembly is preferably placed in the "locked rotor" condition for a short period to halt all residual motion.

Definable but static parameters are stored in non-volatile EEPROM and loaded into the FPGA at power-up. Parameters include Idle RPM and Forward and Reverse definition. Direction of rotation of the armature is definable.

While the foregoing description has been with reference to particular embodiments and contemplated alternative embodiments of the present invention, it will be appreciated by those skilled in the art that changes in these embodiments may be made without departing from the principles and spirit of the invention. Accordingly, the scope of the present invention can only be ascertained with reference to the appended claims.

What is claimed is:

1. A system comprising:
   two rows of magnets wherein each row comprises a plurality of magnets having the same polarity for all of the magnets in that row and the two rows of magnets have opposite polarities so there is a mutual attraction between the two rows, one row being mounted on a stationary magnetic and electromagnets assembly with the magnets spaced longitudinally thereon and the other row being mounted on a rotational magnetic assembly with the magnets spaced longitudinally thereon, and wherein the two rows of magnets are arranged with different pitches, one row having one more magnet than the other to enable the rows to be indexed relative to each other and wherein the stationary magnetic and electromagnets assembly and the rotational magnetic assembly are spaced a uniform radial distance apart;
   at least one electromagnet associated with each magnet of one row of magnets to selectively vary the magnetic field produced by the associated magnet; and
   a control system to selectively energize the electromagnets to induce rotation of the rotational magnetic assembly and control speed of rotation of the rotational magnetic assembly.

2. The system of claim 1, further comprising a battery and wherein the control system selectively couples the battery to the electromagnets to initiate rotation.

3. The system of claim 2 wherein the battery is a rechargeable battery and energy stored in the magnetic field generated during operation is recycled and used to recharge the battery.

4. The system of claim 1 wherein the system is an electrical motor.

5. The system of claim 1 wherein the system is an electrical generator.

6. The system of claim 1 wherein the two rows of magnets are configured in a linear arrangement.

7. The system of claim 1 wherein the two rows of magnets are arranged in a parallel magnet array wherein one row is in a straight line and the second row is staggered by a selected pitch.

8. The system of claim 1 wherein the control system comprises at least one incremental rotational encoder used to derive both RPM and instantaneous positional information in addition to rotational direction and to automatically compensate for acceleration/deceleration conditions.

9. The system of claim 8 wherein the control system comprises a pair of rotary incremental encoders consisting of a relative encoder with an index output and an absolute rotary encoder.

10. The system of claim 1 wherein the electromagnets are low resistance/low inductance electromagnets.

11. The system of claim 1 wherein the control system comprises:
    a position sensor to provide rotational magnetic assembly positional information which is relative to the position of the stationary magnetic and electromagnets assembly and also to provide RPM, instantaneous speed, and directional information;
    a user interface to provide operational controls consisting of one or more controls selected from among the group of controls consisting of On/Off, direction, RPM, operational parameters, test, diagnostic, and calibration functions;
    electromagnet drivers comprising power transistors/FETs that control the current through the electromagnets and energy recovery circuitry utilized to increase power efficiency;
    electromagnet current sensing circuitry which functions to obtain information from the electromagnet drivers and conditions that information and passes said conditioned information to digital control logic; and
    wherein the digital control logic comprises a combination of a microcontroller with hard and programmable digital logic.

12. The system of claim 1, further comprising a power supply for the electromagnets.

13. The system of claim 1 wherein the control system produces pulse width modulation (PWM) to regulate the current through the electromagnets.

14. The system of claim 1, further comprising:
    a base plate;
    a front tower mounted to the base plate;
    a rear tower mounted to the base plate;
    a main shaft rotatably supported by the front and rear towers;
    wherein the rotational magnetic assembly is mounted to the main shaft and wherein respective ends of the rotational magnetic assembly are provided with a torque collar keyway that receives a key on the main shaft;
    torque collars, shaft washers, and shaft nuts at the respective ends of the rotational magnetic assembly to secure the rotational magnetic assembly to the main shaft;
    wherein the main shaft is rotatably mounted in bearings disposed in the front and rear towers;
    wherein the front and rear towers are reinforced by a top tower support;
    a keyway upper pulley and an upper gear belt pulley mounted to the main shaft;
    an upper gear belt holding washer to maintain the upper gear belt pulley on the main shaft;
    a lower gear belt pulley mounted to the shaft of an alternator secured to the base plate proximate the base of the front tower;
    a gear belt to interconnect the upper and lower gear belt pulleys;
    a shaft end play spacer mounted to the opposite end of the main shaft from the upper and lower gear belt pulleys;
    one or more encoders mounted to the main shaft;
    wherein the stationary magnetic and electromagnets assembly and control system are mounted to each side of the front and rear towers.

15. The system of claim 14, further comprising:
    electronic controls and an inverter connected to the alternator and mounted to the base plate;
    inverter cables to electrically connect the alternator to the inverter; and
    a rechargeable battery connected to the inverter and mounted to the base plate.

* * * * *